(12) United States Patent
Park et al.

(10) Patent No.: US 8,130,266 B2
(45) Date of Patent: Mar. 6, 2012

(54) VIDEO SIGNAL SELECTING METHOD AND VIDEO PROCESSING APPARATUS

(75) Inventors: Ki-hong Park, Suwon-si (KR); Young-kil Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1217 days.

(21) Appl. No.: 11/846,627

(22) Filed: Aug. 29, 2007

(65) Prior Publication Data
US 2008/0136906 A1 Jun. 12, 2008

(30) Foreign Application Priority Data
Dec. 6, 2006 (KR) .......................... 10-2006-0123150

(51) Int. Cl.
H04N 7/00 (2006.01)
H04N 7/18 (2006.01)
H04N 5/50 (2006.01)
H04N 5/445 (2006.01)

(52) U.S. Cl. ............. 348/114; 348/570; 725/38; 725/59

(58) Field of Classification Search .................. None
See application file for complete search history.

(56) References Cited

U.S. PATENT DOCUMENTS

| 5,850,212 | A * | 12/1998 | Nishibori ...................... 345/160 |
| 6,411,337 | B2 * | 6/2002 | Cove et al. .................... 348/563 |
| 7,747,968 | B2 * | 6/2010 | Brodersen et al. ............ 715/821 |
| 2006/0064719 | A1 * | 3/2006 | Youden .......................... 725/38 |
| 2007/0052549 | A1 * | 3/2007 | Le ............................ 340/825.72 |

FOREIGN PATENT DOCUMENTS

| JP | 2006-094343 A | 4/2006 |
| KR | 10-2001-0047023 A | 6/2001 |
| KR | 10-2003-0067991 A | 8/2003 |
| KR | 10-2005-0073008 A | 7/2005 |
| KR | 10-2006-0087943 A | 8/2006 |

OTHER PUBLICATIONS

Korean Office Action, dated Mar. 30, 2011, issued in Application No. 10-2006-0123150.
Communication dated Oct. 14, 2011, from the Korean Intellectual Property Office issued in counterpart Korean Application No. 10-2006-0123150.

* cited by examiner

Primary Examiner — John B. Walsh
(74) Attorney, Agent, or Firm — Sughrue Mion, PLLC

(57) ABSTRACT

A video processing apparatus and a method capable of selecting various video signals are provided. The video processing apparatus includes an input unit which receives a video signal select key value by which a video signal select command to select one of the plurality of video signals is recognized; a storage unit which stores a plurality of video signal names corresponding to the plurality of video signals; and a control unit which sets a first display mode or a second display mode according to the duration of the video signal select key value, the first and second display modes indicating opposite orders in which the video signal names corresponding to the plurality of video signal units are displayed, and displays the video signal names sequentially in the set display mode. Thus, a user can conveniently select the video signal.

23 Claims, 7 Drawing Sheets

VIDEO SIGNAL SELECTING METHOD AND VIDEO PROCESSING APPARATUS

CROSS-REFERENCE TO RELATED APPLICATIONS

This application claims priority from Korean Patent Application No. 10-2006-0123150, filed on Dec. 6, 2006 in the Korean Intellectual Property Office, the disclosure of which is incorporated herein by reference in its entirety.

BACKGROUND OF THE INVENTION

1. Field of the Invention

Apparatuses and methods consistent with the present invention relate to a video signal selecting method and video signal processing apparatus, and more particularly, to a video signal selecting method for allowing one of a plurality of video signals to be easily selected and processed in a video processing apparatus having a plurality of video signal inputs including a broadcasting signal input, and to a video signal processing apparatus.

2. Description of the Related Art

In general, a video signal processing apparatus may be implemented by a television, monitor, or the like that directly processes a broadcasting signal received via a radio wave or cable or a video signal input from an external player, such as a digital versatile disc (DVD) player, and displays it. The video signal processing apparatus may also be implemented by a set-top box for outputting the signal to an external display device, and the like.

In a video signal processing apparatus, a user selects a desired video signal using a remote control or a video signal select key of the video processing apparatus. That is, each time the user presses the video signal select key, video signal names indicating video signals are displayed in a predetermined order by an on screen display (OSD) on a screen so that the video signal corresponding to the displayed video signal name is selected. If the user no longer presses the video signal select key, the last selected video signal is displayed.

Conventionally, a user selects one of a plurality of video signals by continuously pressing a video signal select key. If the user misses a desired video signal name, he or she must continuously press the video signal select key to display the video signal name and select a corresponding video signal.

In a video processing apparatus capable of receiving a plurality of video signals, e.g., TV, Video 1, Video 2, Video 3, . . . , Video n (n=integer), including a broadcasting signal, each time a user presses a video signal select key, video signal names corresponding to the plurality of video signals are displayed sequentially in an order of TV→Video 1→Video 2→Video 3→ . . . . →Video n→TV. In a case where a user desires to select the Video 2 video signal, but fails to stop pressing the video signal select key at the Video 2 video signal, he or she must press the select key an additional n times to arrive at the desired Video 2 video signal.

To solve this problem, a display order setting scheme is disclosed in Korean Patent Laid-open Publication No. 10-2005-0039330A, in which video signal names corresponding to a plurality of video signals including a broadcasting signal are displayed in an order set according to usage frequency of each of the plurality of video signals.

In Korean Patent Laid-open Publication No. 10-2006-0047033, a table of video signal names is displayed on a screen so that a user selects a desired video signal by moving a curser up and down on the table, using a remote control for example.

A remote control for a television broadcasting receiver for use with a plurality of digital recording devices networked is disclosed in Japanese Patent Laid-open Publication No. 2006-094343A. In this patent, a remote control and a display device are disclosed, in which an input switching key of the remote control is used as a key for switching video inputs and has a + part and a − part. When pressing the +part of the input switching key of the remote control, a user can select a video signal sequentially in a forward order of TV→Video1→Video2→Video 3→Video 4. When pressing the − part of the input switching key, the user can select the video signal in a backward order of Video 4→Video 3→Video 2→Video 1→TV.

In this conventional technique, however, a user directly sets a display order of video signal names through a separate task, or selects a desired one of video signal names displayed as a table form on a screen by pressing a separate key of a remote control or a curser key. As the user is forced to set a display order, which is a complex task, or select a desired video signal from the displayed table of video signal names by pressing a separate input switching key of the remote control or the curser key as described above, which obstructs current viewing, the user needs to learn a plurality of complex function keys of the remote control. Therefore, user inconvenience is caused, particularly in terms of the user interface of the video processing apparatus.

As the video signal names are structured into a table, the video processing apparatus requires an additional storage. Furthermore, as the functions of the input switching key of the remote control increases, a corresponding program stored in the video processing apparatus for interacting with the remote control functions becomes complicated.

A frequency, a pattern, and the like of an infrared (IR) signal corresponding to the input signal switching key of the remote control must be stored in a storage unit of the video processing apparatus if the above-described methods are implemented in a video processing apparatus, and a corresponding program executed by a control unit implemented by a microprocessor of the video processing apparatus is further complicated.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method for allowing a user to easily select a desired one of a plurality of video signals in a video processing apparatus capable of processing various video signals including a broadcasting signal.

The present invention also provides a method for allowing an input video signal to be selected through a minor modification of a video processing apparatus.

The present invention also provides a method for allowing a user to easily select a video signal through a minor modification of a video processing apparatus or a remote control.

According to an aspect of the present invention, there is provided a video processing apparatus comprising a plurality of video signal units for receiving a plurality of video signals comprising a broadcasting signal, the apparatus comprising: an input unit which receives a video signal select key value by which a video signal select command to select one of the plurality of video signals is recognized; a storage unit which stores a plurality of video signal names corresponding to the plurality of video signals; and a control unit which sets a first display mode or a second display mode according to the duration of the video signal select key value, the first and second display modes indicating opposite orders in which the video signal names corresponding to the plurality of video signal units are displayed, and displays the video signal names sequentially in the set display mode.

The control unit may control the video processing apparatus to display the stored video signal names sequentially in a display order corresponding to the first display mode each time the video signal select key value is received over a duration falling within a set time range.

When the video signal select command is recognized, the control unit may check a currently selected and displayed one of the plurality of video signals and control to display the stored video signal names sequentially in the display order corresponding to the first display mode from stored video signal names subsequent to a current video signal name corresponding to the checked video signal.

The control unit may set the second display mode in which the stored video signal names are displayed sequentially in an opposite order to the display order corresponding to the first display mode when the video signal select key value is received over a duration exceeding a set time range.

When the video signal select key value is received, the control unit may check a currently selected and displayed one of the plurality of video signals, and control to display the stored video signal names sequentially in an opposite display order to the display order corresponding to the first display mode from a previous video signal name each time the video signal select key value is received over a duration falling within the set time range after the second display mode is set.

According to another aspect of the present invention, there is provided a display device comprising a plurality of video signal units for receiving a plurality of video signals comprising a broadcasting signal, the device comprising: an input unit which receives a video signal select key value by which a video signal select command to select one of the plurality of video signals is recognized; a storage unit which comprises a first storage area for storing a plurality of video signal names corresponding to the plurality of video signals, and a second storage area for storing information on a direction in which the plurality of video signal names are displayed sequentially in response to the video signal select key value; and a control unit which sets a display direction so that the stored video signal names may be displayed in the stored display direction or an opposite direction to the stored display direction according to the duration of the video signal select key value, controls to display the stored video signal names sequentially in the set display direction, and selects a video signal corresponding to the displayed video signal name when the video signal select command is not recognized during a preset period of time and then controlling to terminate the video signal selection.

In this case, the control unit may store information on the set display direction in the second storage area of the storage unit so that the stored display direction may be replaced by the set display direction.

The control unit may also control to display a video signal name corresponding to the currently displayed video signal when the video signal select command is recognized.

The storage unit may be included in the control unit.

According to another aspect of the present invention, there is provided a method for selecting a video signal in a video processing apparatus comprising a plurality of video signal units for receiving a plurality of video signals comprising a broadcasting signal, the method comprising: recognizing a video signal select command to select one of the plurality of video signals as a video signal select key value is input; setting a first display mode or a second display mode according to the duration of the video signal select key value, the first and second display modes indicating opposite orders in which video signal names corresponding to the plurality of video signal units are displayed; displaying the video signal names sequentially in the set display mode; and selecting a video signal corresponding to the displayed video signal name when the video signal select command is not recognized during a preset period of time.

In this case, displaying the video signal names sequentially in the set display mode may comprise displaying the stored video signal names sequentially in a display order corresponding to the first display mode each time the video signal select key value is received over a duration falling within a set time range.

The method may further comprise: when the video signal select command is recognized, checking a currently selected and displayed one of the plurality of video signals. In this case, displaying the video signal names sequentially in the set display mode may comprise displaying the stored video signal names sequentially in the display order corresponding to the first display mode from stored video signal names subsequent to a current video signal name corresponding to the checked video signal.

Setting a first display mode or a second display mode may comprise setting the second display mode in which the stored video signal names are displayed sequentially in an opposite order to the display order corresponding to the first display mode when the video signal select key value is received over a duration exceeding a set time range.

The method may further comprise: when the video signal select key value is received, checking a currently selected and displayed one of the plurality of video signals. In this case, displaying the video signal names sequentially in the set display mode may comprise displaying the stored video signal names sequentially in an opposite display order to the display order corresponding to the first display mode from a previous video signal name corresponding to the video signal previous to the checked video signal each time the video signal select key value is received over a duration falling within the set time range after the second display mode is set.

The method may further comprise displaying the video signal name and simultaneously displaying a video signal corresponding to the displayed video signal name.

According to another aspect of the present invention, there is provided a method for selecting a video signal in a display device comprising a plurality of video signal units for receiving a plurality of video signals comprising a broadcasting signal, the method comprising: recognizing a video signal select command to select one of the plurality of video signals as a video signal select key value is input; setting a display direction so that video signal names corresponding to a plurality of stored video signals are displayed sequentially in a pre-stored display direction or in an opposite direction to the stored display direction according to the duration of a single video signal select key value; displaying the video signal names sequentially in the set display mode; and selecting a video signal corresponding to the displayed video signal name when the video signal select command is not recognized during a preset period of time, and terminating the video signal selection.

In this case, the method may further comprise storing the set display direction so that the pre-stored display direction is replaced by the set display direction.

The method may further comprise displaying a video signal name corresponding to a currently displayed video signal when the video signal select command is recognized.

According to another aspect of the present invention, there is provided a video processing apparatus comprising: a plurality of video signal units which receives video signals; an input which receives a video signal select key value for receiving the video signal via one of the plurality of video signal units; and a control unit which sequentially selects the plurality of video signal units in a predetermined order each time the video signal select key value is input, and changes the order according to the duration of the video signal select key value.

In this case, the control unit may maintain a current order when the duration of the video signal key value is smaller than a preset threshold period of time and change to an opposite order to the current order when the duration is greater than the threshold period of time, the change order being applied to a section of the video signal units.

The apparatus may further comprise a display unit which outputs a video signal received via the selected video signal unit; and a storage unit which stores video signal names corresponding to video signals received via the plurality of video signal units, wherein the control unit sequentially selects the plurality of video signal units in the order each time the video signal select key value is input, and controls the display unit to output a video signal received via the selected video signal unit and a corresponding video signal name.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Figure 1:
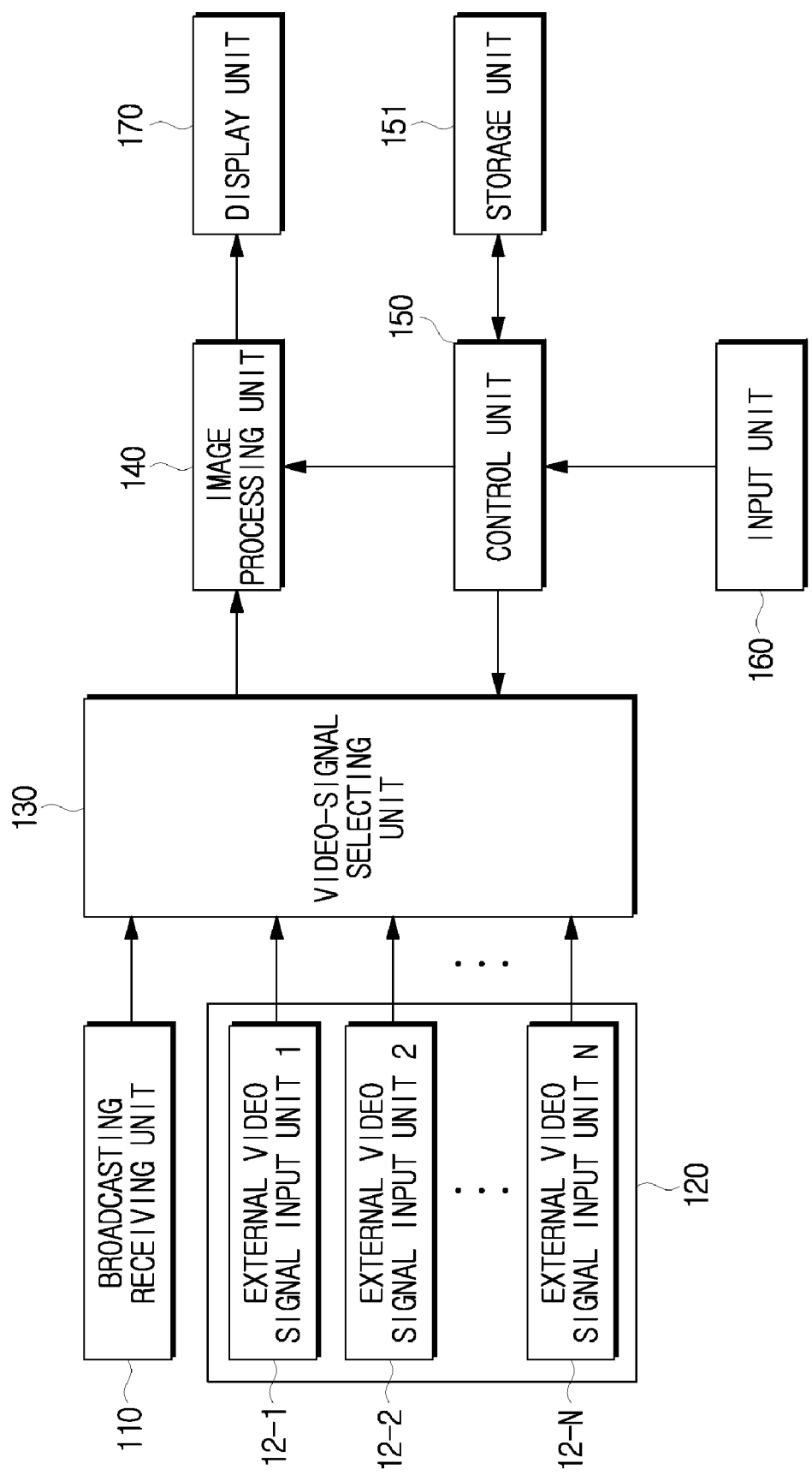
FIG. 1 is a block diagram illustrating a video processing apparatus that implements a video signal selecting method according to an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

FIG. 1 is a block diagram illustrating a television as a video processing apparatus comprising a broadcasting receiving unit for receiving a broadcasting signal and a video signal unit connected with a plurality of external video signal devices according to an exemplary embodiment of the present invention.

Referring to FIG. 1, the television as a video processing apparatus according to an exemplary embodiment of the present invention comprises a broadcasting receiving unit 110 for receiving a broadcasting signal via a radio wave or cable; an external video signal unit 120 comprising a plurality of external video signal input units 12-1 to 12-N for receiving a plurality of video signals from a video tape recorder (VTR), a DVD player, a game machine, and the like; a video signal selecting unit 130 for selecting and outputting one of the plurality of video signals input via the broadcasting receiving unit and the external video signal unit; a storage unit 151 for storing video signal names corresponding to the external video signals; an image processing unit 140 for processing the video signal input from the video signal selecting unit 130; a display unit 170 for displaying the video signal processed by the image processing unit 140. The broadcasting receiving unit 110 and the external video signal input units 12-1 to 12-N may be referred to as a video signal unit.

The display unit 170 may be implemented by a flat display device such as a plasma display panel (PDP) device and a liquid crystal display (LCD) display, a cathode ray tube (CRT), a projector that is a projection-type optical device, an optical system and screen of a projection device, etc.

In the video processing apparatus according to the present invention, the video signal names stored in the storage unit 151 may be device names (e.g., VTR, DVD, etc.) of the connected devices or general terms, such as External Device1, External Device2, Video 1, Video 2, etc.

The television further comprises an input unit 160 for inputting a video signal select command to select one of the plurality of video signals comprising the broadcasting signal, and a control unit 150 for recognizing a period of time the video signal select command is input via the input unit, and controlling to display the video signal names stored in the storage unit 151 sequentially on the display unit 170 in a first or second display mode based on the recognized period of time.

The input unit 160, when integrally formed with the television, may be comprised of switches or may be implemented by a remote control. Alternatively, the input unit 160 may be implemented as a receiving unit for a remote control and the television in order to receive an infrared (IR) signal.

Figure 2:
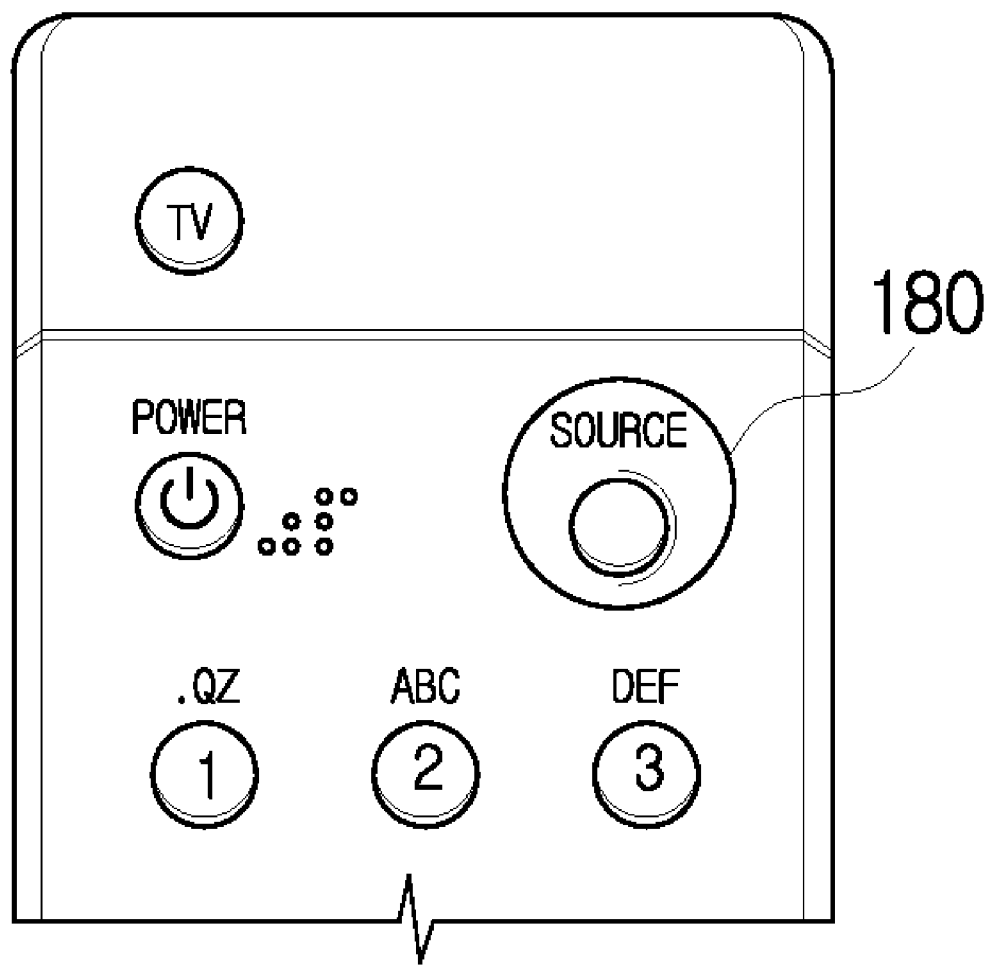
FIG. 2 is an appearance view illustrating a remote control according to an exemplary embodiment of the present invention.

The input unit, when implemented by the remote control, comprises a power key, numeric keys, and a single source select key or a video signal select key 180 for the present invention, as shown in FIG. 2. A user may press the source select key of the remote control or release it so that video signal names are displayed sequentially on a screen and referenced to select a video signal.

It will be understood by those skilled in the art that although not shown, the video signal names are displayed using an on screen display (OSD).

Figure 3:
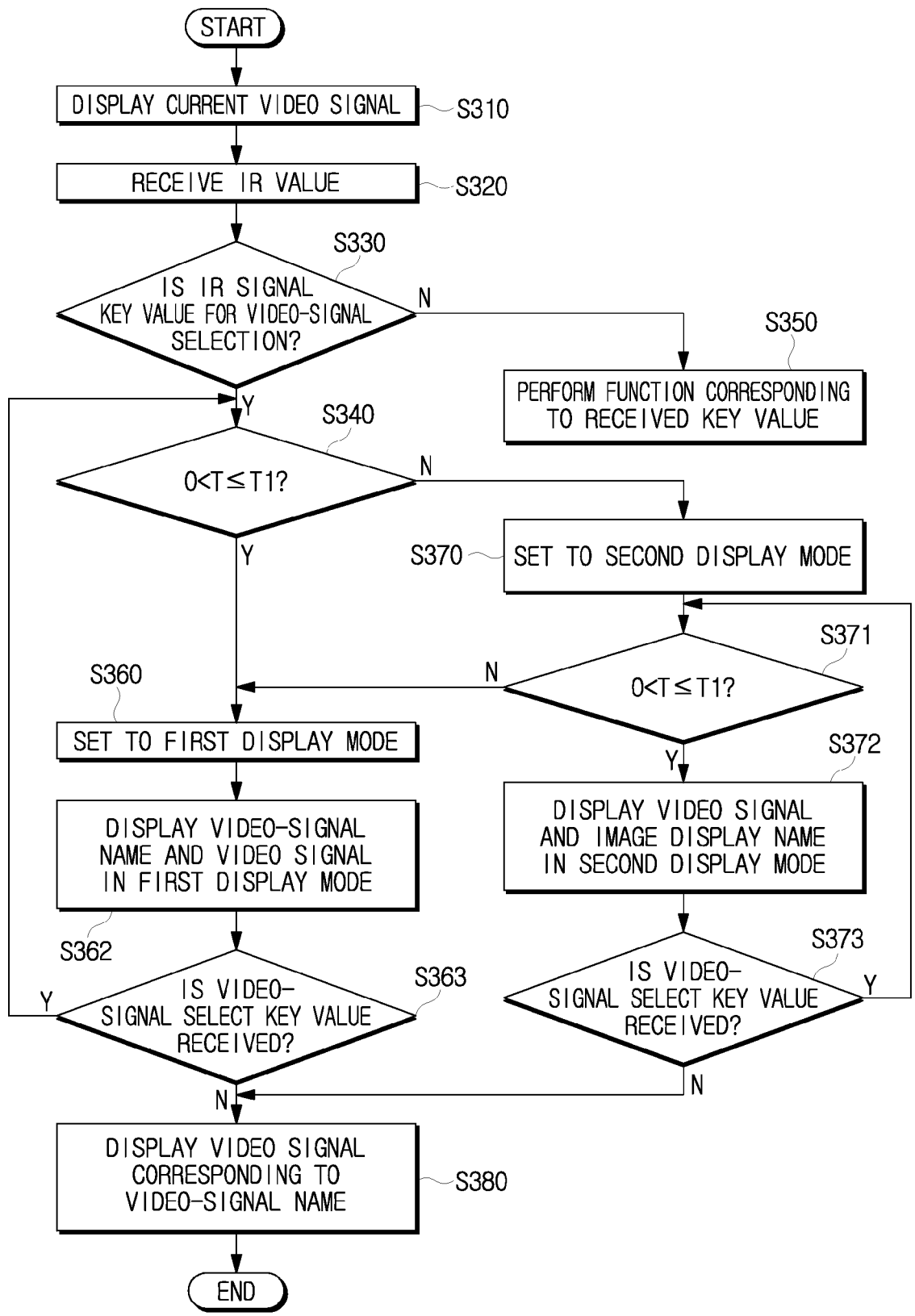
FIG. 3 is a flow chart illustrating a process of selecting a video signal according to an exemplary embodiment of the present invention.

Hereinafter, operation of the video processing apparatus according to an exemplary embodiment of the present invention will be described with reference to FIGS. 3 to 5.

The input unit 160 is described as being a remote control, but may be implemented as a switch comprised in the video processing apparatus.

In the video processing apparatus according to an exemplary embodiment of the present invention, a user presses the video signal select key 180 of the remote control shown in FIG. 2, a transmitting unit (not shown) of the remote control generates an IR signal, and the corresponding input unit 160 as a receiving unit senses the IR signal.

That is, when the IR signal is received via the input unit 160 while a current video signal is being displayed in the display device (S310, S320), it is determined as to whether the received IR signal is a key value for video signal selection (S330). If it is determined that the IR signal is not the key value for video signal selection, a function corresponding to the received key value is performed (S350). The function may be one of functions, such as channel up/down, volume up/down, etc.

If it is determined that the IR signal is the key value for video signal selection, the key value is recognized as a video signal select command and it is determined as to whether the video signal select key value is input over a duration T satisfying that $0<T\leq T1$ (S340).

If it is determined in step S340 that the video signal select key value is input over a duration T satisfying that $0<T\leq T1$, a display mode is set to a first display mode (S360), and the video signal names stored in the storage unit 151 are displayed together with a video signal in the first display mode on the display unit 170 (S362). If the video signal select key value is input with the duration T not satisfying that $0<T\leq T1$, i.e., if the video signal select key value is input over a duration T satisfying that $T1<T$, the display mode is set to a second display mode (S370).

In the case where the current display mode is changed to the second display mode, in order to determine whether the change to the second display mode is according to the intention of a user, the duration of the video signal input key value is determined, i.e., the video signal input key value is input again by the user and the duration of the inputted video signal input key value is determined (S371). If the duration T of the video signal select key value satisfies that $T1<T$, the display mode is set to the first display mode (S360). If the duration T of the video signal select key value satisfies that $0<T\leq T1$, the video signal and the image display name are displayed in the second display mode (S372). It should be noted that the determination carried out in operation S371 is an optional feature in the exemplary embodiment of the video processing apparatus illustrated in FIG. 3. In other words, in the case where the current display mode is set to the second display mode in operation S370, operation may directly proceed to operation S372 to display the video signal and image display name in the second display mode without receiving the user's confirmation in operation S371.

After the video signal names are displayed in the first or second display mode in response to the video signal select command (S362, S372), it is determined again as to whether the video signal select key value is received (S363, S373). If the video signal select key value is received, the duration of the video signal select key value is checked again (S340, S371).

If the video signal select key value is not received, the video signal selection is determined to be terminated, and a video signal corresponding to a currently displayed video signal name is selected and continuously displayed (S380).

The first and second display modes related to directions in which the video signal names are displayed will be described with reference to FIG. 4.

The video processing apparatus comprising the broadcasting receiving unit 110 for receiving a TV signal, and the external signal input unit 120, such as audio visual 1 (AV1), AV2, separate video 1 (S-Video1), S-Video2, Component1, Component2, and high-definition multimedia interface (HDMI), connected with external devices comprises a first display mode and a second display mode. In the first display mode, the video signal names circulate in a forward direction (indicated by a solid line), i.e., in an order of TV→AV1→AV2→S-Video1→S-Video2→Component 1→Component2→HDMI→TV, as shown in FIG. 4. In the second display mode, the video signal names circulate in a backward direction (indicated by a dotted line), i.e., in an order of TV→HDMI→Component2→Component1→S-Video2→S-Video1→AV2→AV1→TV. This is only an exemplary embodiment of the present invention.

In an exemplary embodiment of the present invention, when the video signal select key value is received over a duration falling within a preset time range, the first display mode is set in which the video signal names stored in the storage unit 151 are displayed sequentially in the forward direction (S360) and then the video signal and the image display names are displayed in the first display mode (S362). Thereafter, when the key value is input over a duration T satisfying that "$0<T\leq T1$", the video signal names are displayed sequentially in the forward direction corresponding to the first display mode (S362).

However, when the video signal select key value is input over a duration T satisfying that "$T1<T$", not "$0<T\leq T1$", the second display mode is set (S370). Thereafter, when the key value is input over a duration T satisfying that $0<T=t1$, the video signal names are displayed sequentially in the backward direction (S372).

However, after the second display mode is set and then when the key value is input over a duration T satisfying that "$t1<T$", not "$0<T=t1$", the display mode is set to the first display mode (S360).

Figure 4:
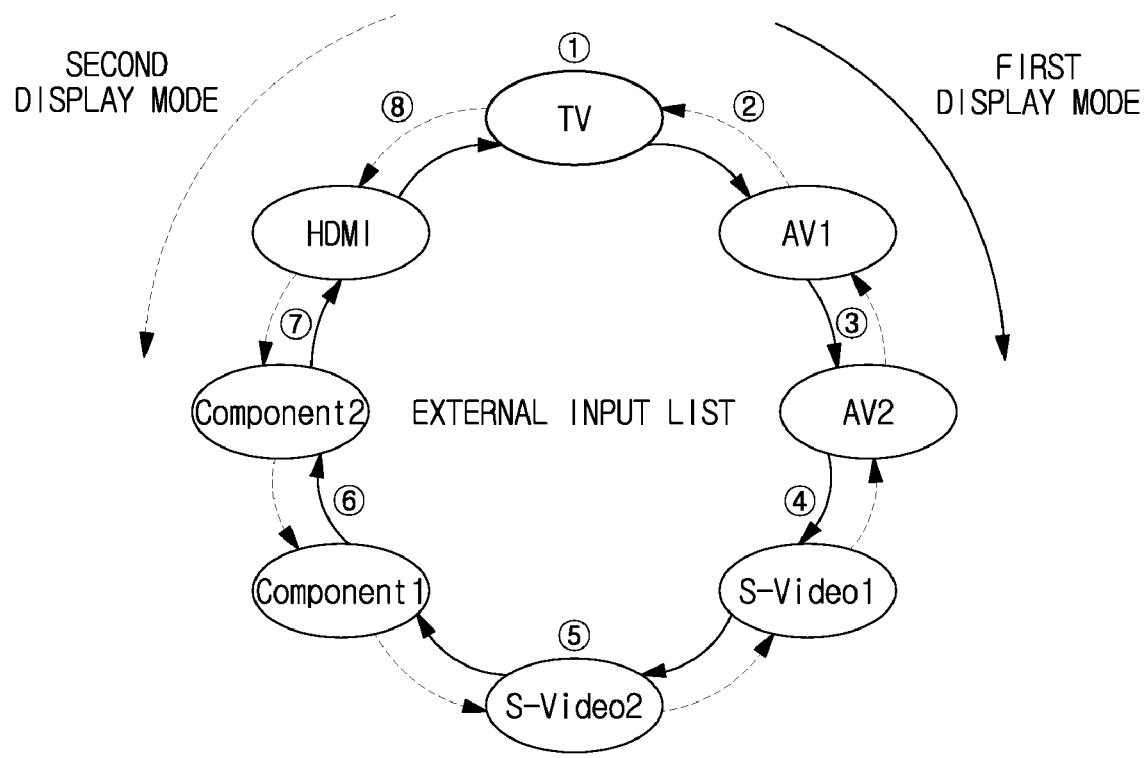
FIG. 4 is a flow diagram illustrating a process of selecting a video signal according to an exemplary embodiment of the present invention.

It is assumed that, in the television comprising video signal receiving units, such as AV1, AV2, S-Video1, S-Video2, Component1, Component2, HDMI, etc. shown in FIG. 4, connected with external devices, and a storage unit which stores video signal names corresponding to the receiving units, a video signal input via S-Video2 is currently displayed and a user desires to switch from S-Video2 to HDMI. When the user inputs a key value over a duration T falling with a certain time range ($0<T\leq T1$) using the video signal select key of the remote control, a video signal select command is recognized. Each time the command is recognized, the video signal names are displayed in the forward direction corresponding to the first display mode from Component1 subsequent to S-Video2. That is, the video signal names are displayed in an order of Component1→Component2→HDMI. If the user releases the key of the remote control at a time when HDMI is displayed, HDMI is selected and a corresponding video signal is displayed.

However, when the video signal select key value is input over a duration exceeding the set time range by the user pressing the video signal select key of the remote control during more than a certain time of period ($T1<T$), the second display mode is set in which the stored video signal names are displayed in an opposite direction to the display direction corresponding to the first display mode. For example, when the first display mode corresponds to a forward direction, the second display mode corresponds to a backward direction.

Thereafter, the second display mode in which the video signal names stored in the storage unit are displayed in the backward direction is performed each time the video signal select key value is received over a duration falling within the set time range ($0<T\leq T1$).

It is assumed that, in the television comprising video signal receiving units, such as AV1, AV2, S-Video1, S-Video2, Component1, Component2, HDMI, etc. connected with external devices, and a storage unit which stores video signal names corresponding to the receiving units, a video signal input via S-Video2 is currently displayed and a user desires to switch from S-Video2 to AV1. When the mode corresponding to the forward direction is set, the input signal is selected in an order of S-Video1→S-Video2→Component1→Component2→HDMI→AV1. However, if the user presses the video signal select key of the remote control for a certain time, preferably about two seconds while AV2 is being currently displayed, the backward mode is set by the control unit of the television. Thereafter, the video signal names are displayed in an order of S-Video1→AV2→AV1 each time the user presses the video signal select key of the remote control, which makes it possible for the user to easily switch the video signal.

In the present invention, information on the display direction corresponding to the first or second display mode may be stored.

Figure 5:
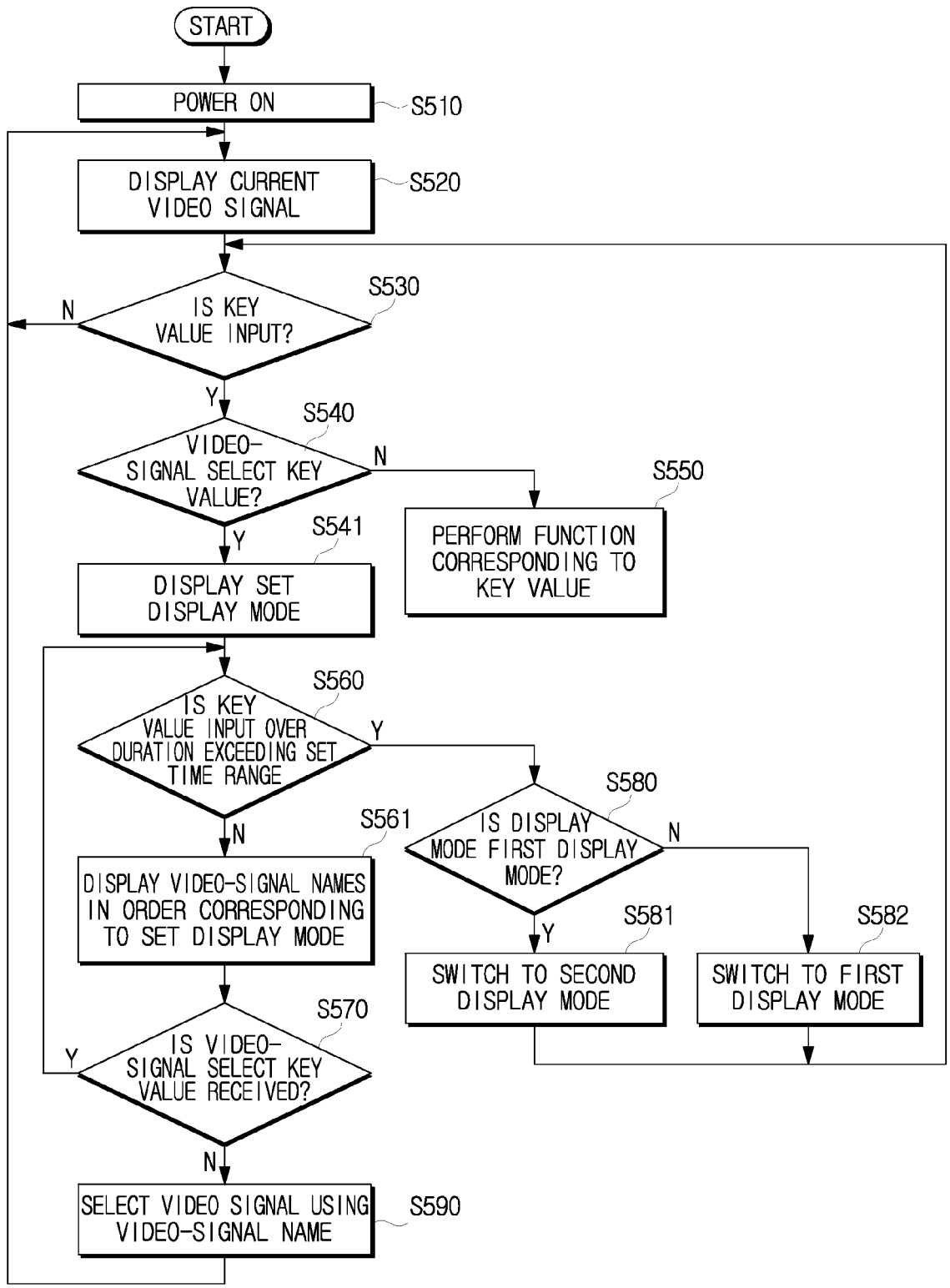
FIG. 5 is a flow chart illustrating a process of selecting a video signal according to another exemplary embodiment of the present invention.

That is, referring to FIG. 5, the video processing apparatus such as a television is powered on (S510), and a user views a broadcasting signal or an input video signal from one of the plurality of external signal input units (S520). At this time, it is determined as to whether a key value is input from the remote control (S530) and whether the input key value is a video signal select key value for video signal switching (S531).

If the input key value from the remote control is not the video signal select key value, a function corresponding to the input key value is performed as described previously (S550). If the input key value is the video signal select key value, a direction in which the video signal names stored in the storage unit are displayed, i.e., the first display mode or the second display mode is displayed as described above (S541). It is then determined as to whether the video signal select key value is input over a duration exceeding the set time range (S560).

As the direction in which the stored video signal names are displayed is indicated, the user can predict the video signals selected each time he or she presses the video signal select key.

That is, the user can predict that when the first display mode is indicated, the video signal names are displayed sequentially in the order corresponding to the first display mode as described above each time the user presses the video signal select key of the remote control, and when the second display mode is indicated, the video signal names are displayed sequentially in the opposite direction to the direction corresponding to the first display mode each time the user presses the video signal select key of the remote control.

Information on the direction in which the video signal names are displayed may be stored in an area of a storage unit that stores the video signal names corresponding to the plurality of video signals or may be stored in a separate storage unit (not shown).

It will be understood by those skilled in the art that the storage unit may be incorporated in a control unit usually called a microcontroller.

The video signal names are displayed sequentially in the direction corresponding to the first or second display mode each time the video signal select key value from the remote control is input over a duration falling within the certain time range. At this time, the user stops to input the video signal select key value at a time when the desired video signal name is displayed, and a video signal corresponding to the selected video signal name is displayed (S590).

If the video signal select key value is input over a duration exceeding the certain time range, i.e., if the user continues to press the video signal select key during more than a certain period of time, the current order in which the video signal name are displayed is changed.

That is, when the video signal select key value is received over a period exceeding the certain time range, it is recognized that the display mode is requested to switch, and then it is determined as to whether the current display mode is the first display mode (S580). If the current display mode is the first display mode, the display mode is switched to the second display mode and stored in the storage unit (S581). If the current display mode is not the first display mode, it is recognized that the current display mode is the second display mode, and the current display mode is switched to the first display mode and stored in the storage unit (S582).

For example, when the first display mode indicating the direction in which the video signal names are displayed is stored in the storage unit, the video signal names are displayed sequentially in the direction corresponding to the first display mode. At this time, when the key value is input over a duration exceeding the certain time range, the current display mode is switched and set to the second display mode. Thereafter, the video signal names are displayed sequentially in the opposite direction to the direction corresponding to the first display mode each time the video signal select key value from the remote control is input over a duration falling within the certain time range. The set second display mode is stored in the storage unit. That is, the first display mode as the stored data is replaced by the second display mode.

Thereafter, when the user presses the video signal select key again or when the user presses the video signal select key after the video processing apparatus is powered on (on→off→on), the apparatus will display the video signal names sequentially in the display direction corresponding to the second display mode.

A video processing apparatus according to another exemplary embodiment of the present invention may be implemented only by a plurality of video signal units, an input unit, and a control unit. The control unit sequentially selects a plurality of video signal units in a predetermined order (i.e., either the first display mode order or the second display mode order) each time the video signal select key value is input from the input unit. Accordingly, the control unit may control to display a video signal from the selected video signal unit on the screen. In this case, the control unit checks an input duration of the video signal select key value each time the video signal select key value is received. When the input duration exceeds the preset threshold value, the control unit selects the next video signal unit in a backward direction. On the other hand, when the duration is smaller than the threshold value, the control unit selects the next video signal unit in the current order.

Figure 6A:
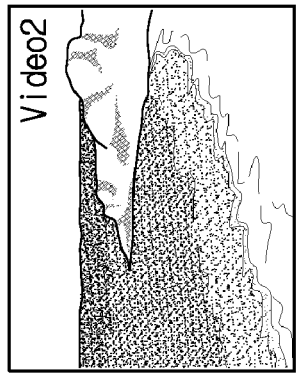
FIGS. 6A to 6C illustrate examples in which video signal names are displayed according to an exemplary embodiment of the present invention.
Figure 6A:
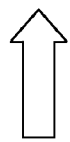
Figure 6A:
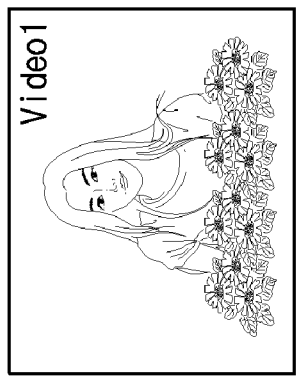
Figure 6A:
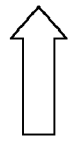
Figure 6A:
Figure 6B:
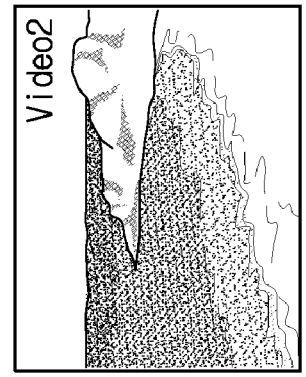
Figure 6B:
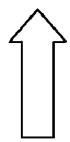
Figure 6B:
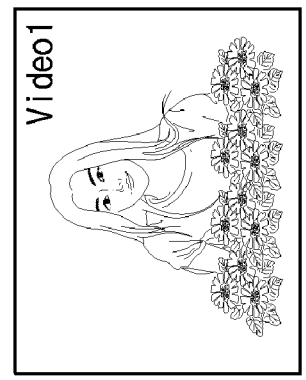
Figure 6B:
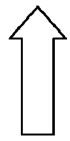
Figure 6B:
Figure 6C:
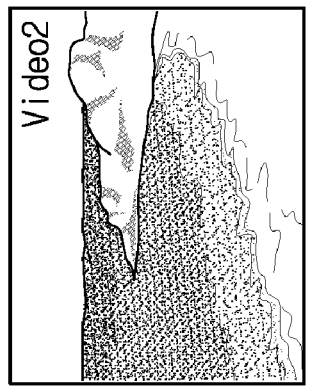
Figure 6C:
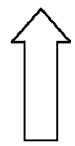
Figure 6C:
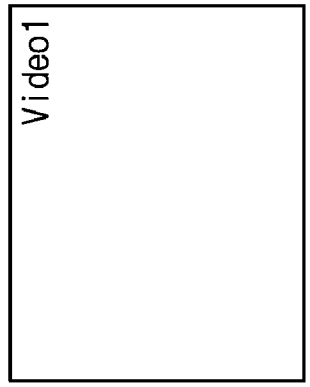
Figure 6C:
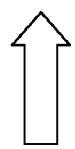
Figure 6C:
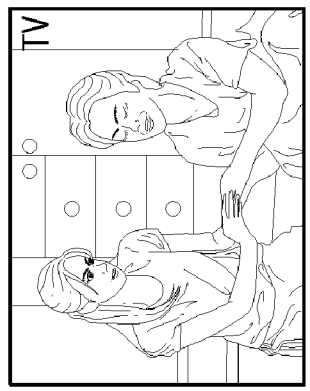

FIGS. 6A to 6C illustrate examples of operation changes according to the video signal select key input. In FIG. 6A, when the key value of the video signal select key is input, a current video signal name is displayed. When the key value is further input, a previous or subsequent video signal and its corresponding video signal name according to the set display direction may be displayed.

In FIG. 6B, only a video signal is displayed with no video signal name. At this time, when the key value of the video signal select key is input, a next video signal and video signal name can be displayed in a current display direction.

In FIG. 6C, when the video signal select command is active, only the image display name is displayed. When the video signal select command is disabled, a video signal may be directly switched from a currently displayed video signal to a last selected video signal. When the video signal select command is enabled, a current screen may be displayed or a screen with no signal may be displayed.

Meanwhile, various displaying methods can be used to provide convenience to users, in addition to the method shown in FIGS. 6A to 6C.

As described above, according to the present invention, the video signal can be selected through a minor modification of the program stored in the control unit implemented by for example a microprocessor without performing a complex process modification.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A video processing apparatus comprising a plurality of video signal units for receiving a plurality of video signals comprising a broadcasting signal, the apparatus comprising:
an input unit which receives a video signal select key value by which a video signal select command to select one of the plurality of video signals is recognized;
a storage unit which stores a plurality of video signal names corresponding to the plurality of video signals; and
a control unit which sets a first display mode or a second display mode according to a duration of the video signal select key value, the first and second display modes indicating opposite orders in which the video signal names corresponding to the plurality of video signal units are displayed, and displays the video signal names sequentially in the set display mode.

2. The apparatus as claimed in claim 1, wherein the control unit controls to display the stored video signal names sequentially in a display order corresponding to the first display mode each time the video signal select key value is received over a duration falling within a set time range.

3. The apparatus as claimed in claim 2, wherein when the video signal select command is recognized, the control unit checks a currently selected and displayed one of the plurality of video signals and controls to display the stored video signal names sequentially in the display order corresponding to the first display mode starting from a stored video signal name subsequent to a current video signal name corresponding to the checked video signal.

4. The apparatus as claimed in claim 1, wherein the control unit sets the second display mode in which the stored video signal names are displayed sequentially in an opposite order to a display order corresponding to the first display mode when the video signal select key value is received over a duration exceeding a set time range.

5. The apparatus as claimed in claim 4, wherein when the video signal select key value is received, the control unit checks a currently selected and displayed one of the plurality of video signals, and controls to display the stored video signal names sequentially in the opposite order to the display order corresponding to the first display mode starting from a video signal name previous to a current video signal name corresponding to the checked video signal each time the video signal select key value is received over a duration falling within the set time range after the second display mode is set.

6. A display device comprising a plurality of video signal units for receiving a plurality of video signals comprising a broadcasting signal, the device comprising:
an input unit which receives a video signal select key value by which a video signal select command to select one of the plurality of video signals is recognized;
a storage unit which comprises a first storage area for storing a plurality of video signal names corresponding to the plurality of video signals, and a second storage area for storing information on a direction in which the plurality of video signal names are displayed sequentially in response to the video signal select key value; and
a control unit which sets a display direction so that the stored video signal names are displayed in the stored display direction or an opposite direction to the stored display direction according to a duration of the video signal select key value, controlling to display the stored video signal names sequentially in the set display direction, and selecting a video signal corresponding to the displayed video signal name when the video signal select command is not recognized during a preset period of time and then controlling to terminate the sequential display of the stored video signals.

7. The device as claimed in claim 6, wherein the control unit stores information on the set display direction in the second storage area of the storage unit so that the stored display direction is replaced by the set display direction.

8. The device as claimed in claim 6, wherein the control unit controls to display a video signal name corresponding to the currently displayed video signal when the video signal select command is recognized.

9. The device as claimed in claim 6, wherein the storage unit is comprised in the control unit.

10. A method for selecting a video signal in a video processing apparatus comprising a plurality of video signal units for receiving a plurality of video signals comprising a broadcasting signal, the method comprising:
recognizing a video signal select command to select one of the plurality of video signals when a video signal select key value is input;
setting a first display mode or a second display mode according to a duration of the video signal select key value, the first and second display modes indicating opposite orders in which video signal names corresponding to the plurality of video signal units are displayed;
displaying the video signal names sequentially in the set display mode; and
selecting a video signal corresponding to the displayed video signal name when the video signal select command is not recognized during a preset period of time.

11. The method as claimed in claim 10, wherein the displaying the video signal names sequentially in the set display mode comprises displaying the video signal names sequentially in a display order corresponding to the first display mode each time the video signal select key value is received over a duration falling within a set time range.

12. The method as claimed in claim 11, further comprising: when the video signal select command is recognized, checking a currently selected and displayed one of the plurality of video signals, wherein:
the displaying the video signal names sequentially in the set display mode comprises displaying the video signal names sequentially in the display order corresponding to the first display mode starting from a video signal name subsequent to a current video signal name corresponding to the checked video signal.

13. The method as claimed in claim 10, wherein the setting the first display mode or the second display mode comprises setting the second display mode in which the stored video signal names are displayed sequentially in an opposite order to a display order corresponding to the first display mode when the video signal select key value is received over a duration exceeding a set time range.

14. The method as claimed in claim 13, further comprising: when the video signal select key value is received, checking a currently selected and displayed one of the plurality of video signals, wherein:
the displaying the video signal names sequentially in the set display mode comprises displaying the stored video signal names sequentially in the opposite order to the display order corresponding to the first display mode starting from a video signal name previous to a current video signal name corresponding to the checked video signal each time the video signal select key value is received over a duration falling within the set time range after the second display mode is set.

15. The method as claimed in claim 10, wherein the displaying the video signal names sequentially further comprises simultaneously displaying a video signal corresponding to each of the sequentially displayed video signal names.

16. A method for selecting a video signal in a display device comprising a plurality of video signal units for receiving a plurality of video signals comprising a broadcasting signal, the method comprising:
recognizing a video signal select command to select one of the plurality of video signals when a video signal select key value is input;
setting a display direction so that video signal names corresponding to a plurality of stored video signals are displayed sequentially in a pre-stored display direction or in an opposite direction to the stored display direction according to a duration of the video signal select key value;
displaying the stored video signal names sequentially in the set display mode; and
selecting a video signal corresponding to the displayed video signal name when the video signal select command is not recognized during a preset period of time, and terminating the sequential display of the stored video signals.

17. The method as claimed in claim 16, further comprising storing the set display direction so that the pre-stored display direction is replaced by the set display direction.

18. The method as claimed in claim 16, wherein the displaying the stored video signal names sequentially further comprises displaying a video signal corresponding to a currently displayed video signal name when the video signal select command is recognized.

19. A video processing apparatus comprising:
a plurality of video signal units which receive a plurality of video signals;
an input which receives a video signal select key value for receiving one of the plurality of video signals via one of the plurality of video signal units; and
a control unit which sequentially selects the plurality of video signal units in a predetermined order each time the video signal select key value is input, and changes the order according to a duration of the video signal select key value.

20. The apparatus as claimed in claim 19, wherein the control unit maintains a current order when the duration of the video signal key value is smaller than a preset threshold period of time and changes the order to an opposite order to the current order when the duration is greater than the threshold period of time, the opposite order being applied to a section of the plurality of the video signal units.

21. The apparatus as claimed in claim 19, further comprising:
a display unit which outputs a video signal received via the selected video signal unit; and
a storage unit which stores video signal names corresponding to video signals received via the plurality of video signal units, wherein:
the control unit sequentially selects the plurality of video signal units in the order each time the video signal select key value is input, and controls the display unit to output the video signal received via the selected video signal unit and a corresponding video signal name.

22. The apparatus as claimed in claim 20, further comprising:
a display unit which outputs a video signal received via the selected video signal unit; and
a storage unit which stores video signal names corresponding to video signals received via the plurality of video signal units, wherein:
the control unit sequentially selects the plurality of video signal units in the order each time the video signal select key value is input, and controls the display unit to output the video signal received via the selected video signal unit and a corresponding video signal name.

23. The apparatus according to claim 1, wherein the plurality of video signals comprise a plurality of different video signals from a plurality of different devices.

* * * * *